United States Patent [19]

Ohkubo

[11] Patent Number: 4,639,113
[45] Date of Patent: Jan. 27, 1987

[54] CAMERA DISPLAY DEVICE
[75] Inventor: Yuji Ohkubo, Ohmiya, Japan
[73] Assignee: Nippon Kogaku K. K., Tokyo, Japan
[21] Appl. No.: 782,104
[22] Filed: Sep. 30, 1985
[30] Foreign Application Priority Data
  Oct. 4, 1984 [JP] Japan .................. 59-208787
[51] Int. Cl.4 ............................................ G03B 17/18
[52] U.S. Cl. ..................... 354/472; 354/474; 354/289.1
[58] Field of Search ............... 354/471, 472, 474, 475, 354/465, 289.1, 289.12

[56] References Cited
U.S. PATENT DOCUMENTS

| 3,818,495 | 6/1974 | Sagara et al. | 354/474 |
| 3,947,862 | 3/1976 | Watanabe et al. | 354/289.1 |
| 4,081,805 | 3/1978 | Takahashi | 354/474 |
| 4,135,795 | 1/1979 | Uno et al. | 354/475 |
| 4,264,165 | 4/1981 | Beauviala et al. | 354/474 |
| 4,309,091 | 1/1982 | Fukuhara et al. | 354/475 X |
| 4,429,979 | 2/1984 | Terada | 354/289.1 |
| 4,589,754 | 5/1986 | Maitani et al. | 354/472 X |

FOREIGN PATENT DOCUMENTS 86825 5/1982 Japan .................. 354/474

Primary Examiner—William B. Perkey
Attorney, Agent, or Firm—Shapiro and Shapiro

[57] ABSTRACT

A display device for simultaneously displaying a manual mode exposure and correction values for optimal exposures of other modes is provided. As a result, a compact display device for displaying a deviation from an optimal exposure of a manual mode and exposure correction values for optimal exposures in aperture-priority, shutter-priority and program modes within the viewfinder at a sufficient resolution.

5 Claims, 10 Drawing Figures

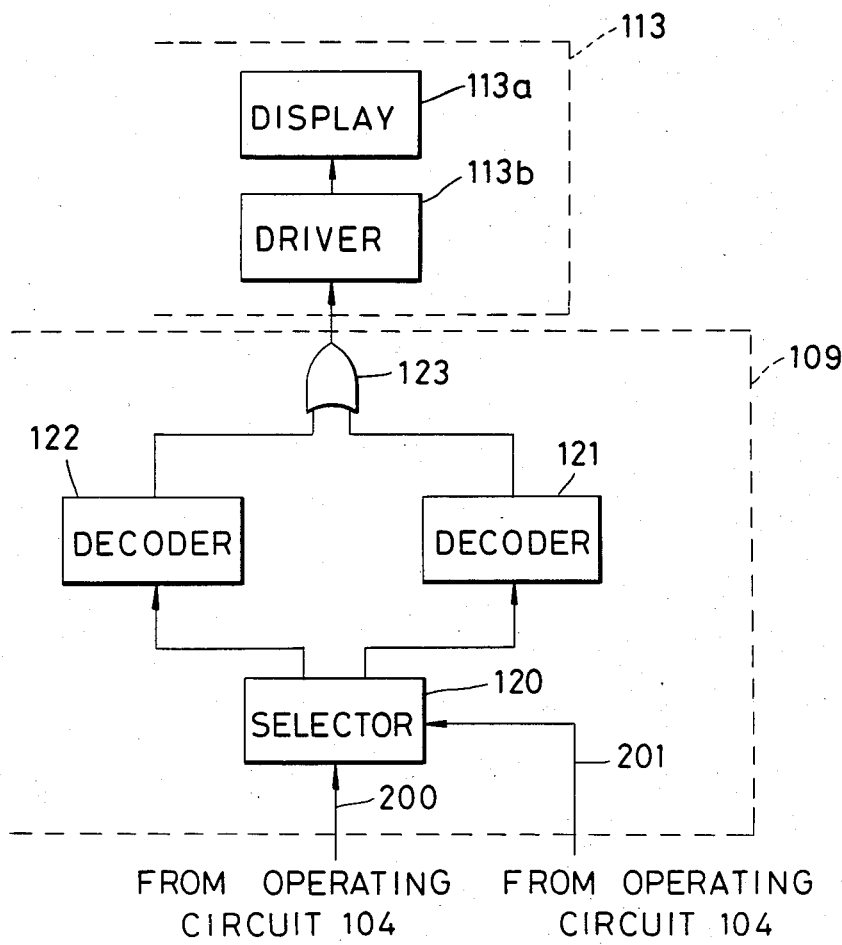

CAMERA DISPLAY DEVICE

BACKGROUND OF THE INVENTION

The present invention relates to a display device for displaying exposure data or the like of a camera.

The volume of photograph data increases with the versatility of photography modes of a camera, especially in the case of a single-lens reflex camera, resulting in complex display. For example, the photography modes include a manual mode for manually setting an aperture value and a shutter speed, an aperture priority mode for controlling the shutter to set an optimal exposure in accordance with a manually preset aperture value, a shutter priority mode for controlling the aperture to obtain an optimal exposure at a manually preset shutter speed, and a program mode for controlling the aperture and the shutter in accordance with a prestored program. In the manual mode, only a one-step value of EV range is displayed in the viewfinder in order to simplify the display contents. However, it is insufficient to provide a resolution corresponding to only one step of the Ev range in the manual exposure mode. As photography information, a correction exposure is not displayed in detail within the viewfinder.

SUMMARY OF THE INVENTION

It is an object of the present invention to provide a compact display device for displaying a deviation from an optimal exposure of a manual mode and exposure correction values for optimal exposures in aperture-priority, shutter-priority and program modes within the viewfinder at a sufficient resolution.

In order to achieve the above object of the present invention, there is provided a display device for simultaneously displaying a manual mode exposure and correction values for optimal exposures of other modes.

BRIEF DESCRIPTION OF THE DRAWINGS

FIG. 10 is a block diagram showing the detailed arrangement of the display device shown in FIG. 1.

DETAILED DESCRIPTION OF THE PREFERRED EMBODIMENT

Figure 1:
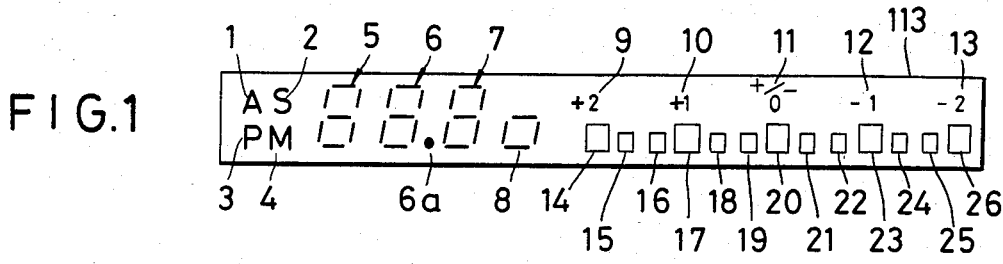
FIG. 1 is a front view of a display device according to an embodiment of the present invention.

FIGS. 1 to 8 show a display device for displaying photography data within a camera viewfinder. A display device 113 consists of LC (liquid crystal) or LED (light-emitting diode) segments. Mode display parts 1 to 4 display exposure modes, respectively. More specifically, the mode display part 1 displays an exposure mode as the aperture-priority mode (to be referred to as an A mode hereinafter). The mode display part 2 displays an exposure mode as the shutter-priority mode (to be referred to as an S mode hereinafter). The mode display part 3 displays an exposure mode as the program mode (to be referred to as a P mode hereinafter). The mode display part 4 displays an exposure mode as the manual mode (to be referred to as an M mode hereinafter). Exposure display parts 5 to 7 comprise 7-segment display parts to display numerals and letters, respectively. A display part 6a displays a decimal point. A display part 8 comprises a one-segment element. The display parts 5 to 8 together display a shutter speed or an aperture value. Each of display parts 9 to 13 indicates a deviation from an optimal exposure and a sign representing the deviation direction (i.e., overexposure or underexposure) of an exposure obtained as a combination of a munually preset aperture value and shutter speed in the M mode. The display parts 9 to 13 thus constitute an exposure scale. The values indicated by the display parts 9 to 13 correspond to correction values in the A, S and P modes. The value representing the optimal exposure is displayed in the display part 11. The display part 9 indicates an overexposure by two steps of the EV range. The display part 10 indicates an overexposure by one step of the EV range. The display part 12 indicates an underexposure by one step of the EV range. The display part 13 indicates an underexposure by two steps of the EV range. It should be noted that EV stands for an exposure value in an additive system of photographic exposure. Display parts 14 to 26 comprise dot elements and indicate resolutions corresponding to ⅓ steps of the EV range for the display parts 9 to 13, respectively.

Figure 2:
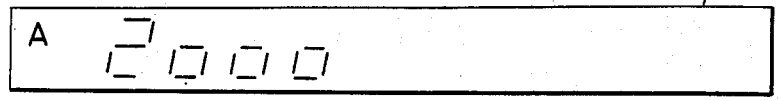
FIGS. 2 to 8 show display states in different exposure modes, respectively.
Figure 3:
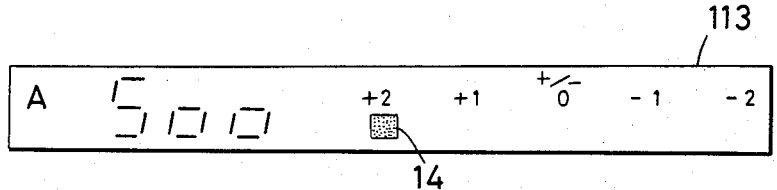
Figure 4:
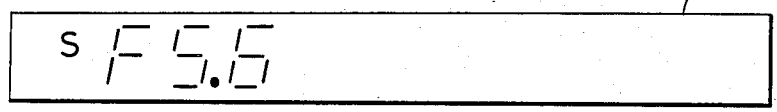
Figure 5:
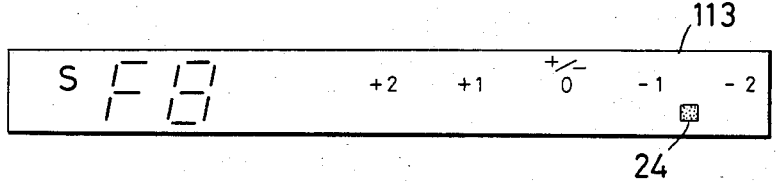

The operation of the display device will be described with reference to FIGS. 2 to 7. FIG. 2 shows a display state in the A mode. The display part 1 displays letter A, and its optimal shutter speed "2000" is displayed by the display parts 5 to 8. FIG. 3 shows a display state when exposure correction is performed in the display state of FIG. 2. When a user turns an exposure correction dial by two steps clockwise to achieve a two-step overexposure state, the display parts 9 to 13 are synchronized with rotation of the dial, so that the display part 14 is turned on, thereby indicating that the current exposure is a two-step overexposure with respect to the optimal exposure. The shutter speed is changed from "2000" as shown in FIG. 2 to "500" (FIG. 3) displayed by the display parts 5 to 7, i.e., the shutter speed is decreased by two steps, thereby obtaining the optimal exposure. FIG. 4 shows a display state in the S mode. The display part 2 displays letter S, and at the same time the optimal F stop "F5.6" is displayed by the display parts 5 to 7 and 6a. The exposure of the display state shown in FIG. 4 will be corrected in the following manner. When the user turns the exposure correction dial counterclockwise so as to obtain 4/3-step underexposure, the display parts 0 to 13 are synchronized with rotation of the dial, and the display part 24 is turned on, thereby indicating that the current exposure is the 4/3-step underexposure in the same manner as in FIG. 3. In order to change the state of FIG. 4 so as to achieve the 4/3 underexposure the aperture value is changed from "F5.6" to "F8", as shown in FIG. 5. In the P mode, the mode display part 3 displays letter P. Other display contents are the same as those of the S mode, and a detailed description will be omitted. When exposure correction is performed, a program flow is changed in a program controller in an operating circuit 104 to be described later.

When exposure correction is performed in the A and S modes, a dot appears next to the shutter speed value or the aperture value during the exposure correction. The user can thus know that exposure correction is being performed.

Figure 6:
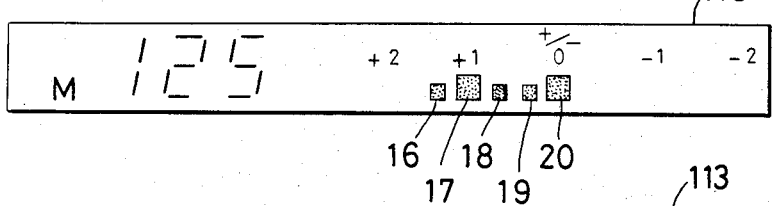
Figure 7:
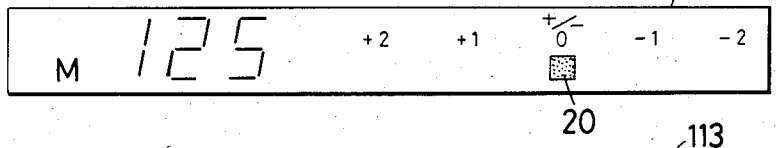

FIG. 6 shows a display state in the M mode. The display part 4 displays letter M, and a shutter speed "125" manually preset by a shutter speed selector (not shown) is displayed in the display parts 5 to 7. In the M mode, the display parts 9 to 13 are always selectively turned on to indicate an underexposure or overexposure. Of the display parts 14 to 26, parts between a part (the part 16 in FIG. 6) representing a deviation from the optimal exposure and the part 20 representing the optimal exposure are turned on (this display is referred to as a bar display). The overexposure and underexposure are indicated with respect to the display part 20 as the center of the bar. FIG. 6 shows a display state wherein the current exposure is given as the 4/3-step overexposure with respect to the optimal exposure. In this case, the user turns the exposure correction dial or the shutter-speed selector to obtain the optimal exposure so that only the display part 20 is turned on while checking the ON states of the display parts 14 to 26. When the optimal exposure is achieved, as shown in FIG. 7, only the display part 20 is turned on, so that an exposure deviation given by the corrected aperture value or shutter speed falls within ±1/6 step of the true optimal exposure.

Figure 8:
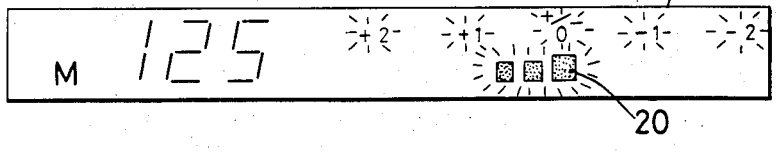

Assume that the user sets the camera in the S mode (or the A or P mode) shown in FIG. 5 and then resets it to the M mode. Also assume that the user does not return the exposure correction dial to the initial position and changes only the exposure mode. In a conventional camera, the optimal exposure is calculated on the basis of a −4/3 EV value and results in the 4/3-step underexposure with respect to the true optimal exposure. However, according to the embodiment described above, when the M mode is set while the exposure correction dial is not turned, all the display parts 9 to 26 flicker and a deviation from the optimal exposure is displayed, as shown in FIG. 8. The user can know his incorrect operation or can intentionally make an overexposure or underexposure. It should be noted that only the display parts 9 to 13 may flicker.

Figure 9:
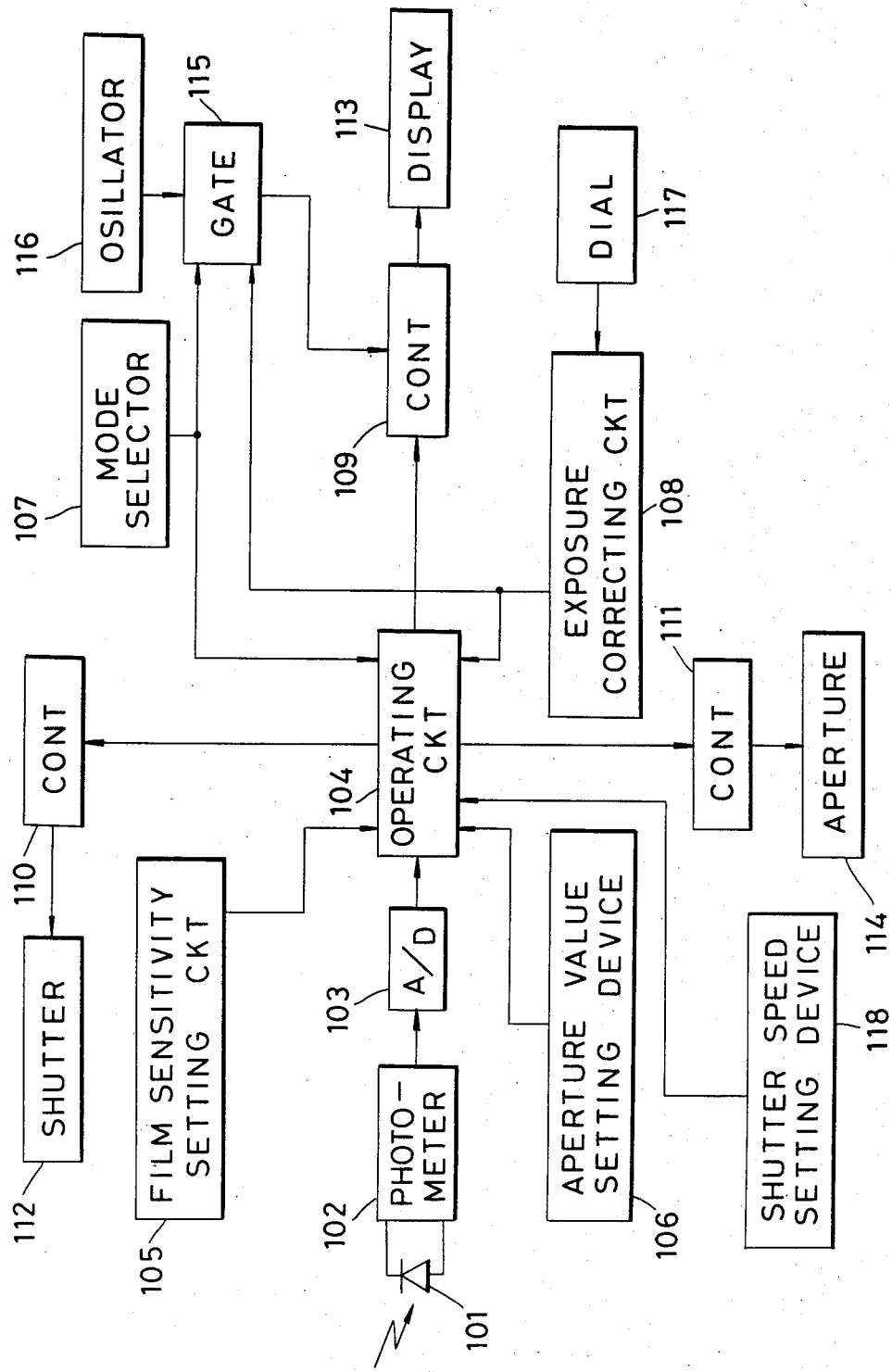
FIG. 9 is a block diagram of a camera with a built-in display device of the present invention.

FIG. 9 is a block diagram of a camera having the display device described above. A photometer 102 is connected to a photosensor 101 for sensing brightness of the object to be photographed. The photometer 102 calculates a voltage corresponding to the brightness of the object. The voltage from the photometer 102 is supplied to an A/D converter 103, and digital data therefrom is supplied to an exposure operating circuit 104. The operating circuit 104 comprises a CPU such as a microcomputer. The exposure operating circuit 104 receives an ISO/ASA signal from a film sensitivity setting circuit 105, a shutter signal from a shutter speed setting device 118, an aperture signal from an aperture value setting device 106 and a correction signal from an exposure correcting circuit 108. The ISO/ASA signal represents the sensitivity of the currently loaded film. The shutter signal represents a shutter speed. The aperture signal represents a preset aperture of the photographing lens. The correction signal represents an exposure correction value set by the exposure correction dial. The exposure operating circuit 104 performs an exposure and supplies shutter speed data to a shutter controller (CONT) 110, the aperture value data to an exposure controller (CONT) 111 and display data (shutter speed data or aperture value data) to a display controller (CONT) 109. The display controller 109 also receives an oscillation pulse from an oscillator 116 through a gate 115. As shown in FIG. 8, when the M mode is selected while an exposure correction dial 117 is set at a given correction value, the gate 115 is enabled in response to signals from a mode selector 107 and an exposure correcting circuit 108 to gate the oscillation pulse to the display controller 109. The display controller 109 causes the display parts to flicker in response to the oscillation pulses from the oscillator 116 supplied through the gate 115, as shown in FIG. 8. The shutter controller 110 controls a shutter 112 in response to a signal for mechanically or electrically actuating the shutter 112. The exposure controller 111 controls an aperture value in response to a signal for mechanically or electrically actuating an aperture 114. The display controller 109 supplies the exposure mode signal, the shutter speed signal or the aperture value signal to a display 113 to cause the display 113 to perform the operations as shown in FIG. 2 to 8.

The display 113 displays the exposure mode, the shutter speed and the aperture value. At the same time, in the A mode, the display 113 serves as a display for displaying an exposure correction value. In the M mode, the display 113 serves as a display for displaying an underexposure or overexposure. When the exposure correction is not cancelled, the display 113 serves as an alarm device. In this manner, the single display 113 can serve as a multifunction display/alarm device. When exposure correction is performed in the A, S and P modes, the display 113 causes the display parts 9 to 13 to turn on and the display parts 14 to 26 to selectively display the exposure correction value in dot display. In the M mode, the display 113 causes the display parts 9 to 13 to turn on and the display parts 14 to 26 to perform bar display. It is therefore easy for the user to distinguish the A mode from the M mode. Even if the user forgets resetting exposure correction in the M mode, the caution function is performed, that is, the display parts 9 to 26 flicker. Therefore, picture taking with an improper exposure can be prevented, and an accurate optimal exposure can be obtained. In the above embodiment, the exposure correction display in the A mode is given by dot display, and the exposure deviaiton display in the M mode is given by bar display. However, the exposure correction display may be made by bar display, and the exposure deviation display may be made by dot display.

FIG. 10 is a block diagram of the display device for performing dot display in the A, S and P modes and bar display in the M mode. A display 113a consists of the display parts 14 to 26. A driver 113c driven the display 113a in response to a signal from the display controller 109. A selector 120 receives a display signal 200 and a mode signal 201 from the operating circuit 104. The display signal 200 is used for displaying a value preset by the dial 117, and the mode signal 201 represents a selected mode. When the mode signal represents the M mode, the selector 120 supplies the display signal 200 to a decoder 122 so as to perform bar display. When the mode signal 201 represents one of the A, S and P modes, the selector 120 supplies the display signal 200 to a decoder 121 so as to perform dot display. The decoder 122 decodes the display signal 200 to a bar display signal. The bar display signal is supplied to the driver 113b through an OR gate 123. The decoder 121 decodes the display signal 200 to a dot display signal which is then supplied to the driver 113b through the OR gate 123.

Lines between the display signal 200, the selector 120, the decoders 121 and 122, the OR gate 120, the driver 113b and the display 113a in FIG. 10 are given as single lines. However, since the operating circuit 104 comprises a CPU, the signal lines can be regarded as 4-bit parallel lines, respectively. The case is also the same in FIG. 9.

What is claimed is:

1. A camera operative in a first mode as an automatic control mode for automatically controlling at least one of an aperture and a shutter so as to obtain an optimal exposure, and in a second mode for manually controlling an aperture value and a shutter speed to be controlled, and having a member operated in the first mode to deviate an exposure to be controlled from the optimal exposure, including:
   (a) detecting means for detecting a deviation of the exposure from the optimal exposure and an exposure deviation direction thereof upon operation of said member in the first mode and generating a first detection signal; and
   (b) display means having a plurality of display parts for displaying the deviation and the exposure deviation direction in response to the first detection signal;
   (c) said detecting means being adapted to generate a second detection signal representing a deviation of an exposure and an exposure deviation direction thereof obtained as a combination of a manually preset aperture value and shutter speed in the second mode; and
   (d) said plurality of display parts being adapted to display the deviation and the exposure deviation direction in response to the second detection signal.

2. A camera according to claim 1, wherein said plurality of display parts comprises one main display part for representing that the deviations represented by the first and second detection signals are zero, and a plurality of auxiliary display parts for displaying the deviaitons and the exposure deviation direcitons represented by the first and second detection signals.

3. A camera according to claim 2, wherein said display means drives, in response to one of the first and seocnd detection signals, one of said plurality of auxiliary display parts for displaying the deviation and the exposure deviation direction represented by said one of the first and second detection signals, and, in response to the other of the first and second detection signals, said main display part, said one of said plurality of auxiliary display parts which displays the deviation and the exposure deviation direction represented by said other of the first and second detection signals, and at least one of said plurality of auxiliary display parts sandwiched between said main display part and said one of said plurality of auxiliary display parts which displays the deviation and the exposure deviation direction represented by said other of the first and second detection signals.

4. A camera according to claim 1, wherein said display means displays a scale of the deviation and the exposure deviation direction upon operation of said member in the first mode and the scale irrespective of operation of said member in the second mode.

5. A camera according to claim 1, further including means for generating a third detection signal representing that said member is operated in the second mode, and said display means is periodically operated in response to the third detection signal.

* * * * *